United States Patent [19]

Kusano

[11] Patent Number: 5,796,397
[45] Date of Patent: Aug. 18, 1998

[54] INFORMATION PROCESSING DEVICE WITH INPUT DATA SHARING AMONG SEVERAL APPLICATIONS

[75] Inventor: Fumio Kusano, Nara, Japan

[73] Assignee: Sharp Kabushiki Kaisha, Osaka, Japan

[21] Appl. No.: 551,066

[22] Filed: Oct. 31, 1995

[30] Foreign Application Priority Data

Nov. 4, 1994  [JP]  Japan .................. 6-271235

[51] Int. Cl.$^6$ ........................................ G06F 3/00
[52] U.S. Cl. ........................... 345/339; 395/680
[58] Field of Search ...................... 395/339, 348, 395/963, 672, 680; 345/339, 348, 349, 346, 963

[56] References Cited

U.S. PATENT DOCUMENTS

| | | | |
|---|---|---|---|
| 5,157,384 | 10/1992 | Greanias et al. | 345/156 |
| 5,157,763 | 10/1992 | Peters et al. | 345/340 |
| 5,301,268 | 4/1994 | Takeda | 345/340 |
| 5,375,200 | 12/1994 | Dugan et al. | 345/348 |
| 5,448,739 | 9/1995 | Jacobson | 395/680 |
| 5,491,784 | 2/1996 | Douglas et al. | 345/352 |
| 5,497,484 | 3/1996 | Potter et al. | 345/348 X |
| 5,517,606 | 5/1996 | Matheny et al. | 345/352 |
| 5,579,521 | 11/1996 | Shearer et al. | 395/680 |
| 5,606,674 | 2/1997 | Root | 345/346 |

FOREIGN PATENT DOCUMENTS

| | | |
|---|---|---|
| 64-18356 | 1/1989 | Japan . |
| 2-89152 | 3/1990 | Japan . |
| 2-89153 | 3/1990 | Japan . |
| 5-40738 | 2/1993 | Japan . |

*Primary Examiner*—A. Katbab
*Attorney, Agent, or Firm*—David G. Conlin; David D. Lowry

[57] ABSTRACT

An information processing device is described which is capable of easily changing a current application to new one during inputting data for said application through a composite input screen and of effectively using the input data between applications. Two or more kinds of application programs are stored in a store means such as ROM. Every application mode may have respective input items stored as adapted record structure in a store means such as RAM. The device is provided with a reading means for reading data inputted and stored in each application mode and a correcting means for correcting the read-out data and has a function for displaying data inputted or corrected on a display screen. By changing the setting of input items during the operation of inputting and correcting means, it is possible to change the current application mode to another application mode, thereby the inputting and correcting means actuated for another application mode and the data inputted and corrected in the initial mode are used in the new application mode.

3 Claims, 14 Drawing Sheets

| Type: | Schedule | | | |
|---|---|---|---|---|
| Date: | ✓Schedule | | ☒ Alarm: | |
| | To DO | | | |
| Time: | Ann1 | P/M | 8 : 30 | A/M |
| | Ann2 | | | |

Specification Meeting "Next Year" products
with: US,CANADA Members
at: Conference Room A

FIG.8

Type: To DO ▼   — 58

Due Date: 10/25/1994 ⇅   — 56

Priority: ☐     ☐ Done

57 —

Specification Meeting "Next Year" products
with: US,CANADA Members
at: Conference Room A    — 59

INFORMATION PROCESSING DEVICE WITH INPUT DATA SHARING AMONG SEVERAL APPLICATIONS

BACKGROUND OF THE INVENTION

The present invention relates to an information processing device which is capable of operating with a number of applications by freely changing a current application mode to another mode during the operation of inputting data or correcting the input data in the current mode, allowing transferring the inputted or corrected data into the new mode. The device may be used in information devices such as electronic pocket-computers and portable system devices.

In use of a conventional electronic pocket-computer with at least two applications for treating data depending on time-and-date, e.g., for schedule management and task management, it is necessary to independently input and edit data for each application because each of applications may have specific items besides common items: each application is different in its data structure from the other applications and, therefore, requires separately inputting data.

Japanese Laid-open Patent Publication No. 5-40738 describes a conventional portable electronic device which is capable of executing an application with front-end processors of other specified functions (e.g., calendar function and electronic calculator function), thereby realizing directly inputting data on date and time and calculation results, which are provided by the specified functions, and using the data for processing with current application. This enables a main application to use data from other application belonging to the main application. However, it can not provide the possibility that data being inputted may be directly used at a time between a plurality of applications.

Japanese Laid-open Patent Publications No.2-89152 and No. 2-89153 describe conventional devices which have a schedule management application improved by adding the facility of calculating a number of days, automatically using date of currently indicated data and the current calendar date.

Japanese Laid-open Utility Model Publication No. 64-18356 discloses a conventional device which is provided with a function for calculating by using data contained in a MEMO-application and capable of conducting calculation on numeric values with a sign ".".

However, in practical use of the above-mentioned applications, there is an equivalent item "Date" in both functions "schedule management" and "task management". Namely, since they have a common "time-depending data", there may occur such a case that a user enters an input data but desires to register said data for the other application. In other words, it is desirable to determine what application shall use input data, not before but during the data inputting operation because this may provide the possibility of exchanging input data between equivalent applications, realizing using input data widely and effectively.

A conventional pocket-computer requires a user to previously designate what application is used and then to enter data for said application. To change the application for which the input data shall be used or registered during the inputting operation, the user must perform the following steps of: (1) temporarily storing a character string of currently inputted data within a clip board; (2) interrupting or finishing the data inputting operation; (3) switching over to another application; (4) bringing into the state for inputting data for the actuated application; and (5) pasting the character string (data) stored in the clip board. Furthermore, if the preceding application and the new application have different input items, the clipped data shall be classified and separately pasted to corresponding items, i.e., input data stored before the application change can not be pasted as entire data to an input of the new application. It is, therefore, laborious to use once inputted data for any different application.

SUMMARY OF THE INVENTION

A primary object of the present invention is to provide an information processing device which is capable of easily changing a current application to another on a composite input screen with a menu of input items including selection of kinds of applications, whereby an input data item being inputted in one application mode is easily converted into input data item for another application, and which is capable of effectively using input data which is common or equivalent for both applications by reflecting said data to the data content of the new application.

Another object of the present invention is to provide an information processing device which is capable of selecting which of two methods, "AUTO" and "MANUAL (with User's instruction)", of performing the process to compare and correlate input items of a preceding application mode with input items of a new application mode, giving flexibility of the data converting operation.

Another object of the present invention is to provide an information processing device wherein input data for an initial application, which can not be used for the new application, is stored together with data for the new application in an area or separately in a different area of a store means for use later in case of selecting the related application.

Another object of the present invention is to provide an information processing device comprising a data inputting means, a first store means for storing data inputted by the data inputting means, a second store means for storing a plurality of programs, a reading means for reading the data stored in the first store means, a correcting means for correcting the data read by the reading means, a display means for indicating on its screen the read data being inputted or corrected and a control means for controlling the above-mentioned means, wherein (1) in operation with an activated program stored in the second store means, the application mode is changed by using an application switching means, input data stored in a buffer or data registered therein during the data inputting or correcting operation is converted and transferred from the preceding application mode into the new application mode and this conversion causes a plurality of data items of the initial application mode to be compared with data items of the new application mode, thereby allowing those having common contents to transfer into the new application mode and preventing those having no equivalent from transferring into the new application mode. In the above-mentioned case (1), conversion of data from the initial application mode to the new application mode can be performed in "AUTO" mode only.

Another object of the present invention is, therefore, to provide an information processing device wherein in addition to the "AUTO" mode, has a manual transferring mode to transfer a plurality of data items for the initial application mode into corresponding data items for the new application mode according to the user's instruction, these two modes are selectively applied and, when the latter mode is selected, a transfer mode selecting screen image is presented, wherein the user specifies the data item for the new application mode to move each data item of the preceding application thereto.

In the above-mentioned case (1), those of data items of the initial application mode, which have no equivalent in the data items of the new application mode, will be erased.

Another object of the present invention is, therefore, to provide an information processing device wherein the unmatched data items are also stored in the new application mode. These data items, however, can not be used for the new application mode and, therefore, stored after the last effective data item in the memory area. Another method is such that link information indicating an address of said unmatched data is placed after the effective data stored in an area and the unmatched data is stored in a different area. The new application uses only effective data, but if the new mode is changed further to the initial application mode, the unmatched data can be used for restoring the initial data items for the restored application.

BRIEF DESCRIPTION OF THE DRAWINGS

FIGS. 16 A and 16 B are flow charts for explaining the operation of the device when switching the task management function to the schedule function or other function in case of FIG. 18.

PREFERRED EMBODIMENT OF THE INVENTION

Figure 1:
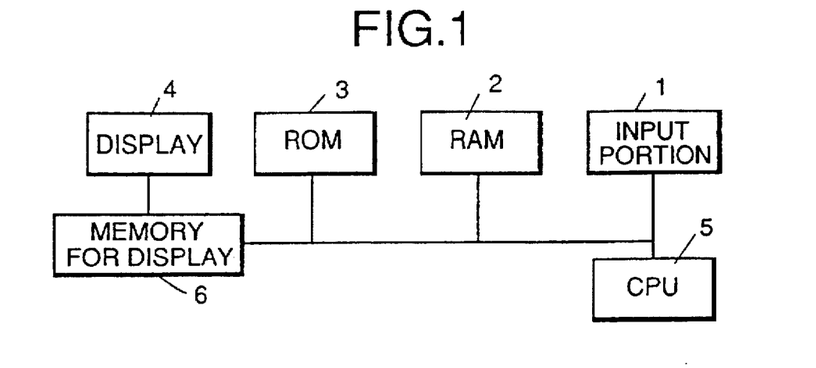
FIG. 1 is a construction view for explaining an information processing device embodying the present invention.

FIG. 1 is a construction view for explaining an information processing device embodying the present invention, which comprises an input portion 1, a RAM (Random Access Memory) 2, a ROM (Read Only Memory) 3, a display 4, a CPU (Central Processing Unit) 5 and a display memory 6.

The input portion 1 is an input device such as a keyboard for inputting character data. The RAM 2 serves as the first storing device for memorizing data inputted from the input portion 1. The ROM 3 serves as the second storing device for storing application programs to be used by the information processing device of the present invention. The display 4 is a Liquid Crystal Display Panel or like means for displaying the stored data. The CPU 5 is a control means for drive control of the RAM 2, ROM 3 and display 4.

The ROM 3 stores therein two or more kinds of application programs. Each application mode includes input items which are stored in an adapted record structure in a RAM 2. In each application mode, input data can be read back by reading means, corrected by correcting means and displayed on a display screen by displaying means. The above-mentioned functions are selectable by pressing designated keys. Changing a setting value of an input item when operating in an application mode causes the inputting or correcting means for the current application to be alternated with the inputting or correcting means for another application and, at the same time, the data obtained by the switched application mode is applicable in a new application mode.

Figure 2:
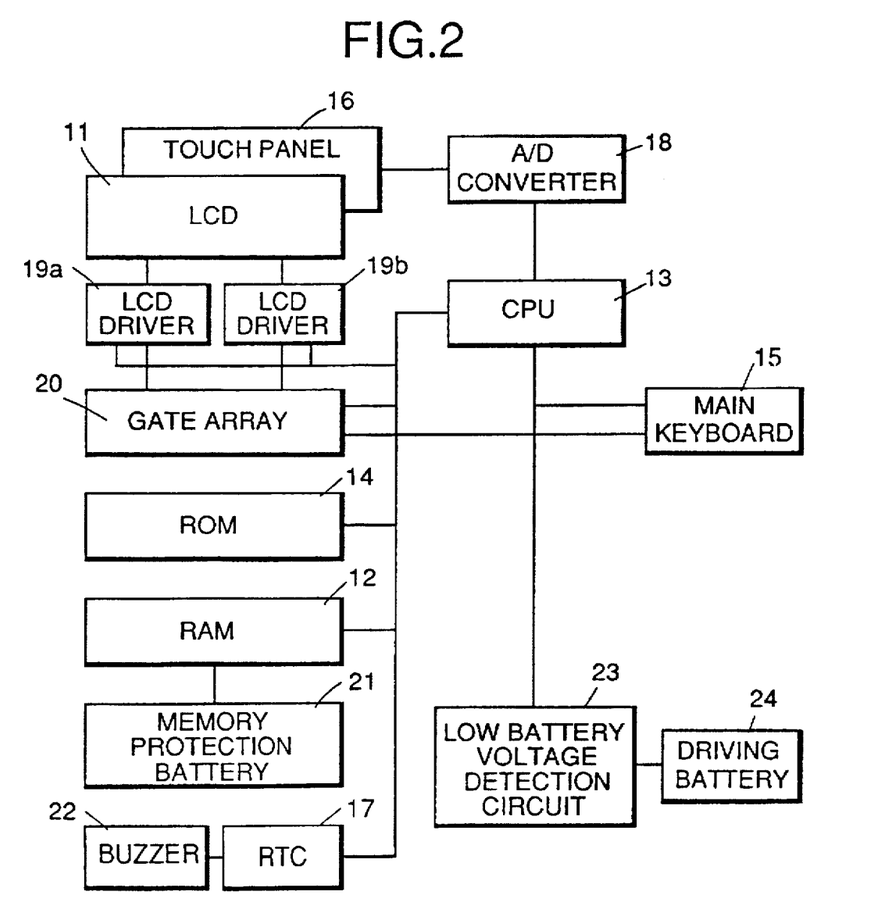
FIG. 2 is a block diagram showing a hardware construction of an information processing device according to the present invention.

FIG. 2 illustrates a hardware structure of an information processing device embodying the present invention, which comprises a LCD (Liquid Crystal Display) 11, a RAM 12, a CPU 13, a ROM 14, a main body keyboard 15, a touch panel 16, a RCT (Routing Control), an A-D converter 18, LCD drivers 19a, 19b, a gate array 20, a memory protection battery 21, a buzzer 22, a battery voltage-drop detecting circuit 23 and a driving battery 24.

The ROM 14 containing pocket-computer functions and application programs for realizing the present invention, the data input keyboard 15 are connected to the LCD 11, the RAM 12 for storing input data and the CPU 13 for controlling the operation of the device. The touch panel 16 is used for the purpose of improving the operability of the hardware.

The above-mentioned pocket-computer is a portable information processing device that posses at least two applications each including input data items indicating date and time such as (1) a schedule function for realizing schedule management; (2) a task management function for realizing the management of finished and unfinished tasks-events; (3) a management function 1 for management of anniversaries by specifying date and (4) a management function 2 for management of anniversaries by specifying month and week data.

Figure 3:
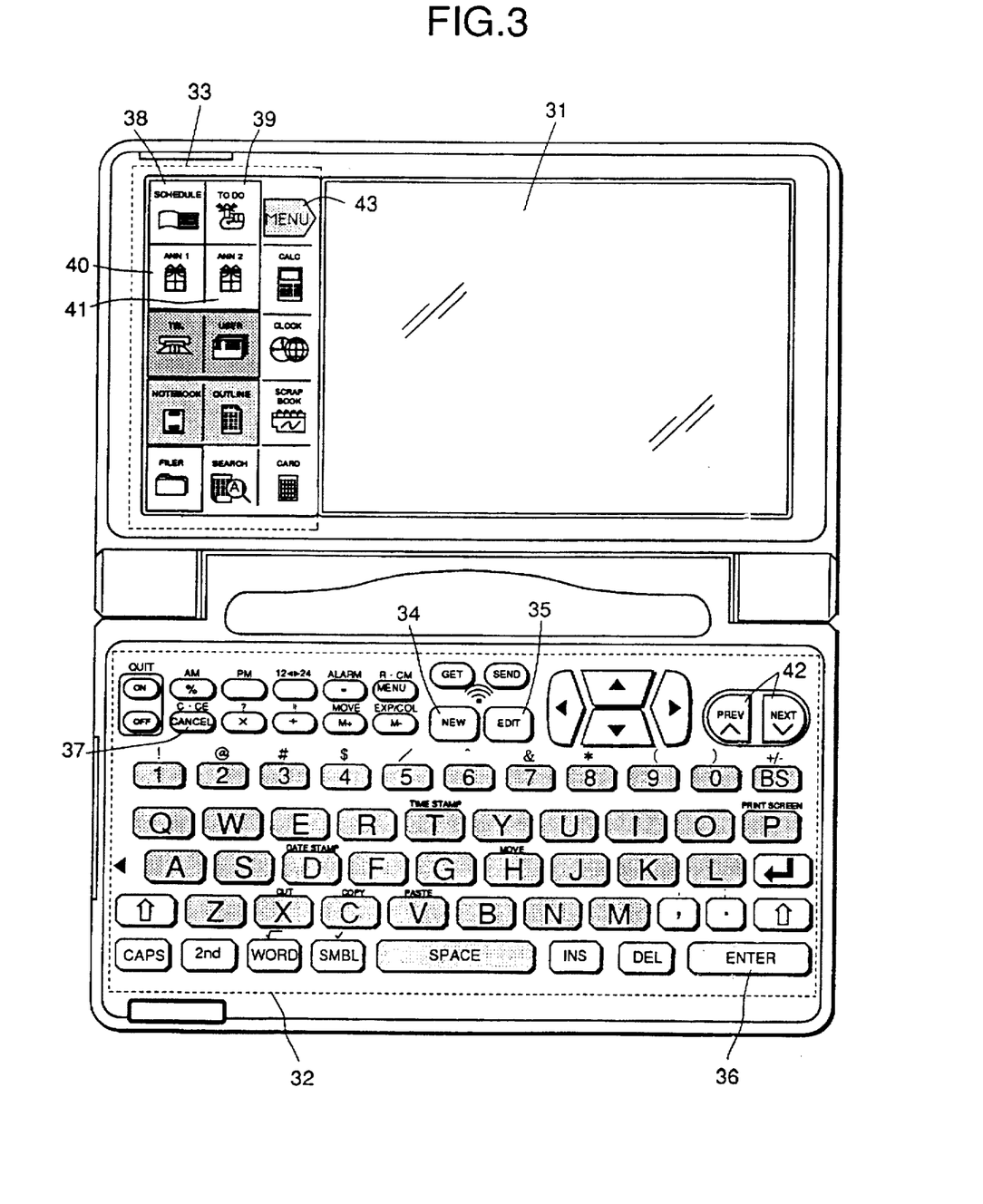
FIG. 3 is a view showing a layout of keys on a main body of an information processing device according to the present invention.

FIG. 3 is a plan view showing an external appearance of a pocket-computer representing an example of an information processing device. In FIG. 3, there is shown a LCD touch panel 31, an alphanumeric keyboard 32, an application-function selector switch 33, a NEW key 34, an EDIT key 35, an ENTER key 36, a CANCEL key 37, SCHEDULE key 38, a TODO key 39, an ANN1 key 40, an ANN2 key 41, a PREV key 42, a NEXT key 42 and a MENU key 43.

The input keyboard 32 comprises alphanumeric keys for inputting data, the NEW key 34 for transferring into a new data inputting mode, the EDIT key 35 for transferring into a mode for correcting data being displayed, the ENTER key 36 for registering data being inputted or corrected, the CANCEL key 37 for interrupting inputting data or editing input data, the PREV key 42 for indicating preceding data and the NEXT key 42 for indicating proceeding data. There are application keys consisting the SCHEDULE key 38 for driving the schedule application, the TODO key 39 for driving a task management application, the ANN1 key 40 for driving an anniversary application 1, the ANN2 key 41 for driving an anniversary application 2 and the MENU key 43 for opening a menu of operations.

Figure 4:
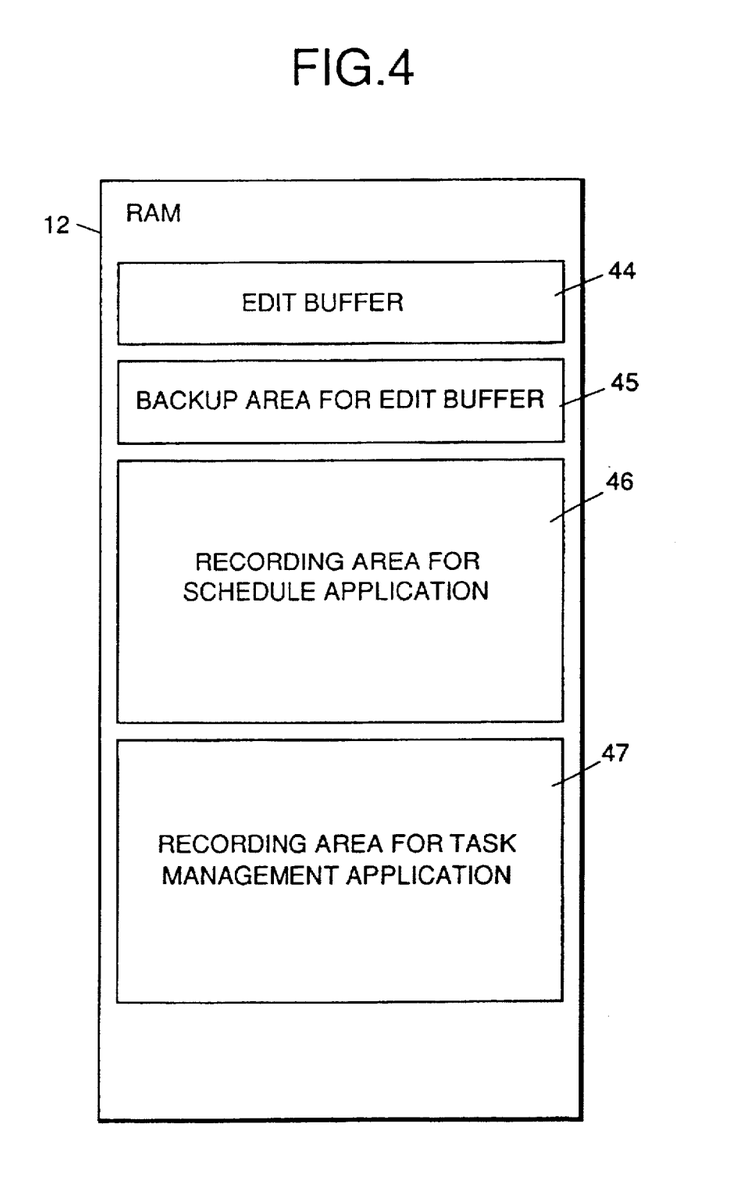
FIG. 4 is a block diagram showing a scheme of allocation of areas on a RAM.

FIG. 4 is a block diagram for schematically illustrating the allocation of areas in the RAM 12 of FIG. 2. In FIG. 4, numeral 44 designates a buffer for data edition, 45 a preserving area for preserving the data edit buffer content, 46 a recording area for the schedule application and 47 a recording area for the task management application.

As shown in FIG. 4, the RAM 12 has areas arranged thereon: the edit buffer 44 used when inputting and editing input data, the edit buffer preserving area 45, the data area 46 for the schedule application and the data area 47 for the task management application.

Figure 5:
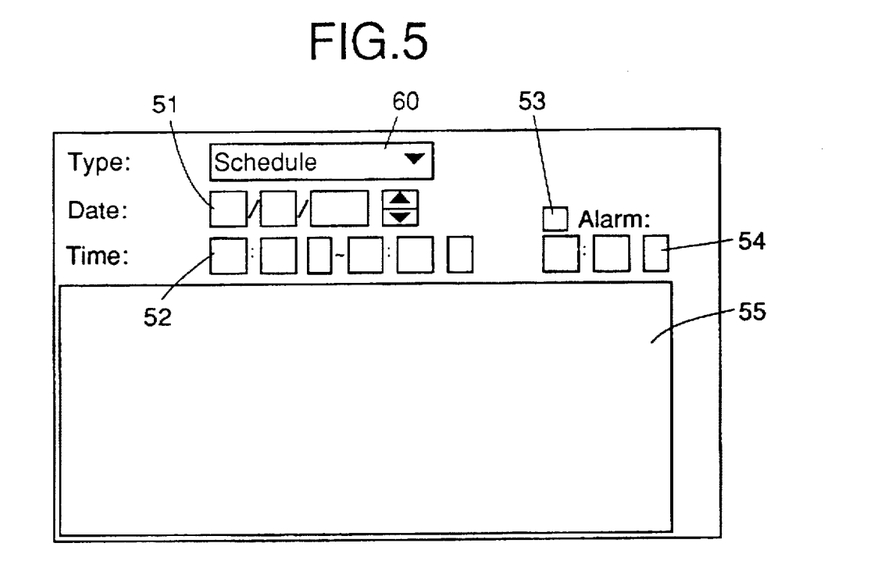
FIG. 5 shows a screen image of an initial input for a schedule application according to the present invention.
Figure 6:
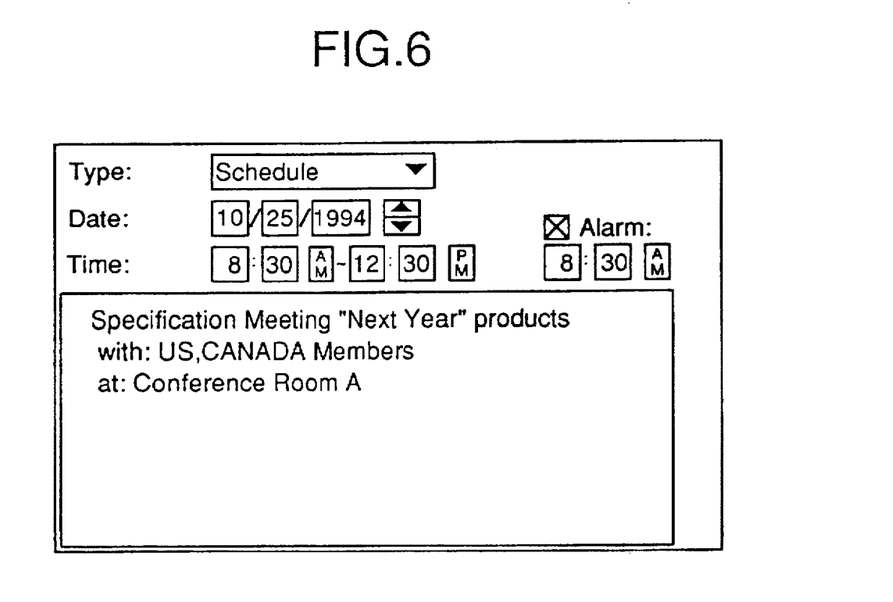
FIG. 6 shows a screen image for inputting and correcting data for a schedule application according to the present invention.
Figure 7:
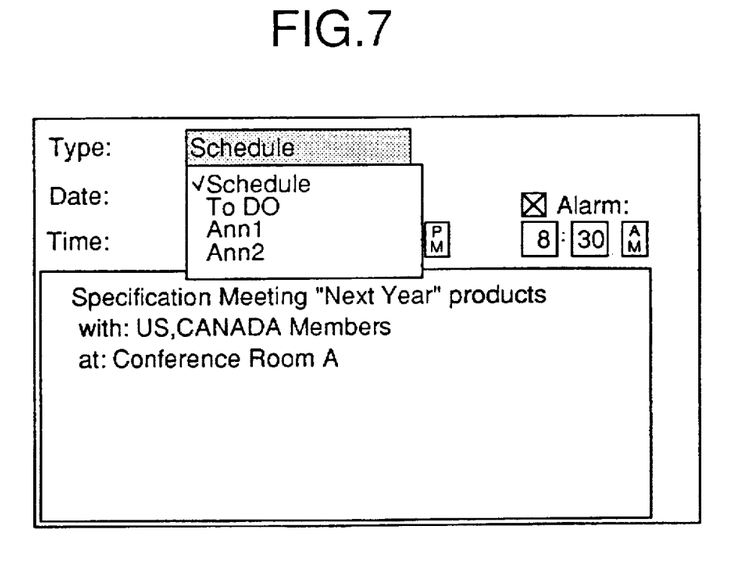
FIG. 7 shows a open state of a pull-down menu of TYPE for changing applications according to the present invention.
Figure 8:
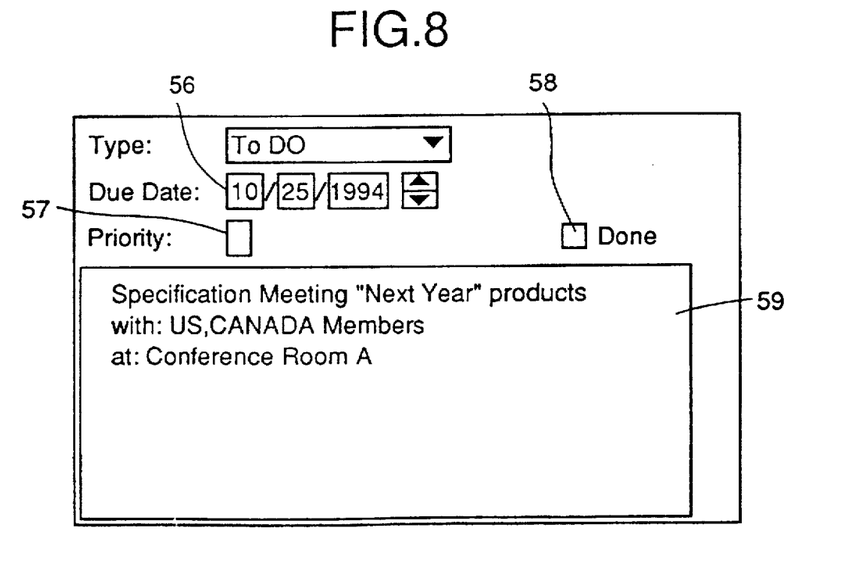
FIG. 8 shows a screen image of input data to be corrected when executing a task management application "ToDo".
Figure 11:
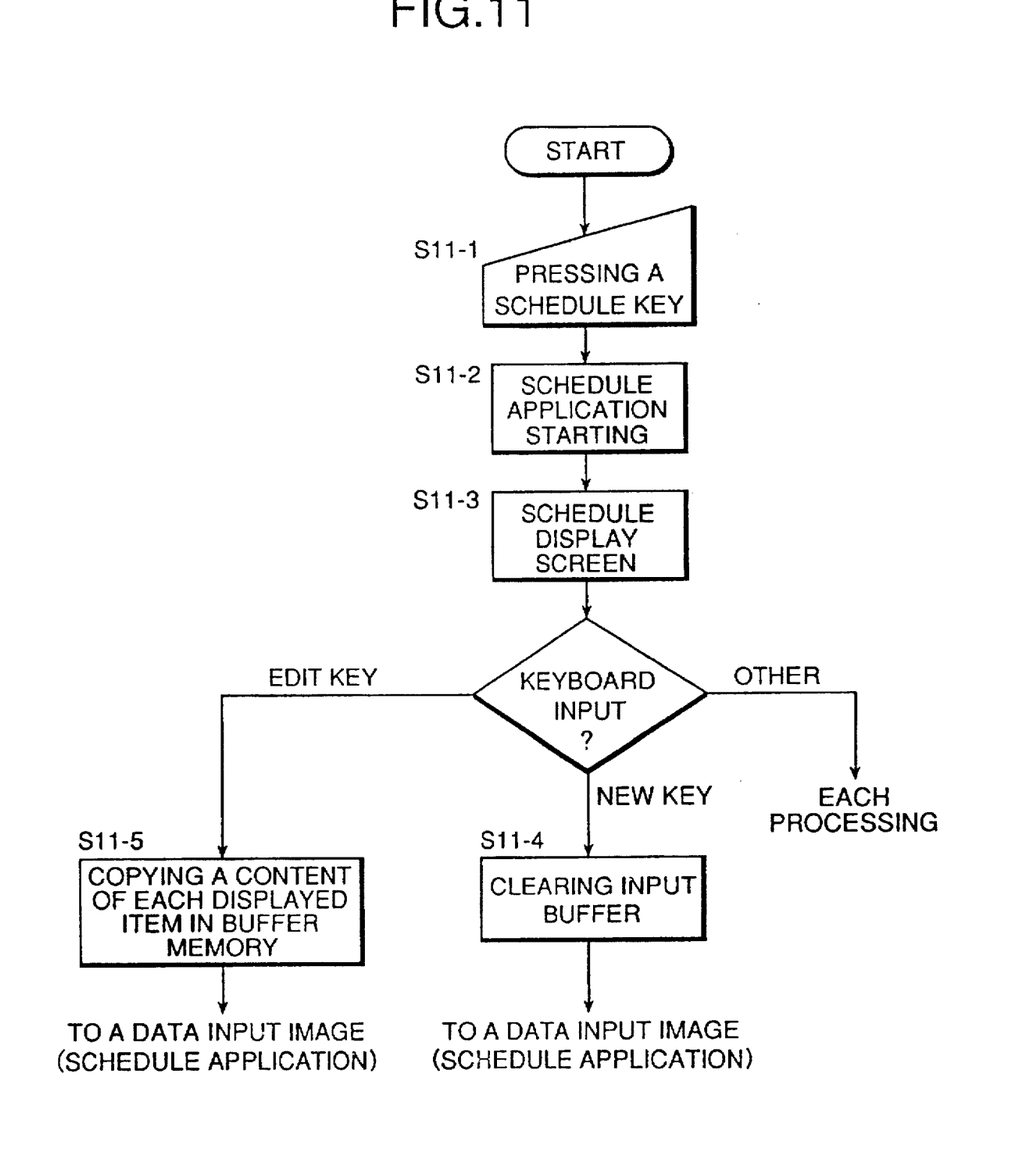
FIG. 11 is a flow chart for explaining the operation of the device in "schedule" mode according to the present invention.
Figure 12:
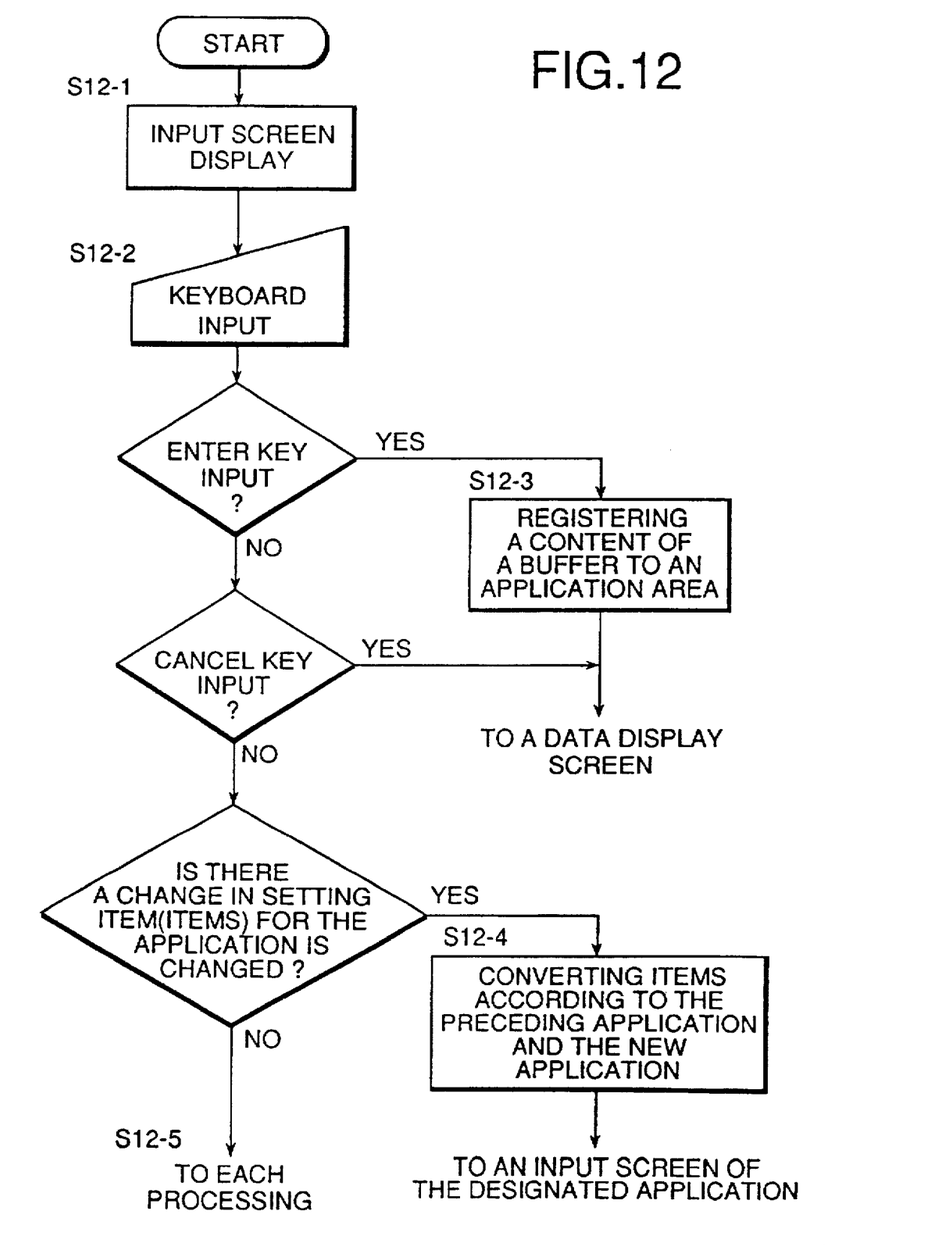
FIG. 12 is a flow chart for explaining the operation of the device when switching data inputting and application mode in each application mode according to the present invention.

The operation of a first embodiment of the present invention in two modes (e.g., "Schedule Application" mode and "Task Management Application" mode) will be explained below with reference with FIGS. 5-8 showing display screen images and FIGS. 11 and 12 showing flow charts:

FIG. 5 illustrates a screen image of an initial input for the schedule application, FIG. 6 an example of an input for the schedule application, FIG. 7 an example of a screen image when opening the pull-down menu of TYPE (kinds of applications) and FIG. 8 an example of data input and edition with the task management application. In these figures, numeral 51 designates the date (Date) of execution of a task (work), 52 the start/end time (Time) of the task, 53 the existence or absence of an alarm, 54 the time when the alarm shall start sounding, 55 a description (content) of the task, 56 the date (Due Date) of completion of a task, 57 the priority, 58 a result of checking the completion of the task (Done), 59 a description (content) of the completed task and 60 the name (Type) of application.

In this embodiment, the schedule application includes 5 kinds of input items—the task (work) execution date (Date) 51, the task start/end time (Time) 52, the existence or absence of an alarm 53, the alarming time 54 and the task description 55 while the task management application includes 4 kinds of input items—the task completion date (Due Date) 56, the priority 57, the check for the completion of the task (Done) 58 and the completed task description 59.

Figure 17:
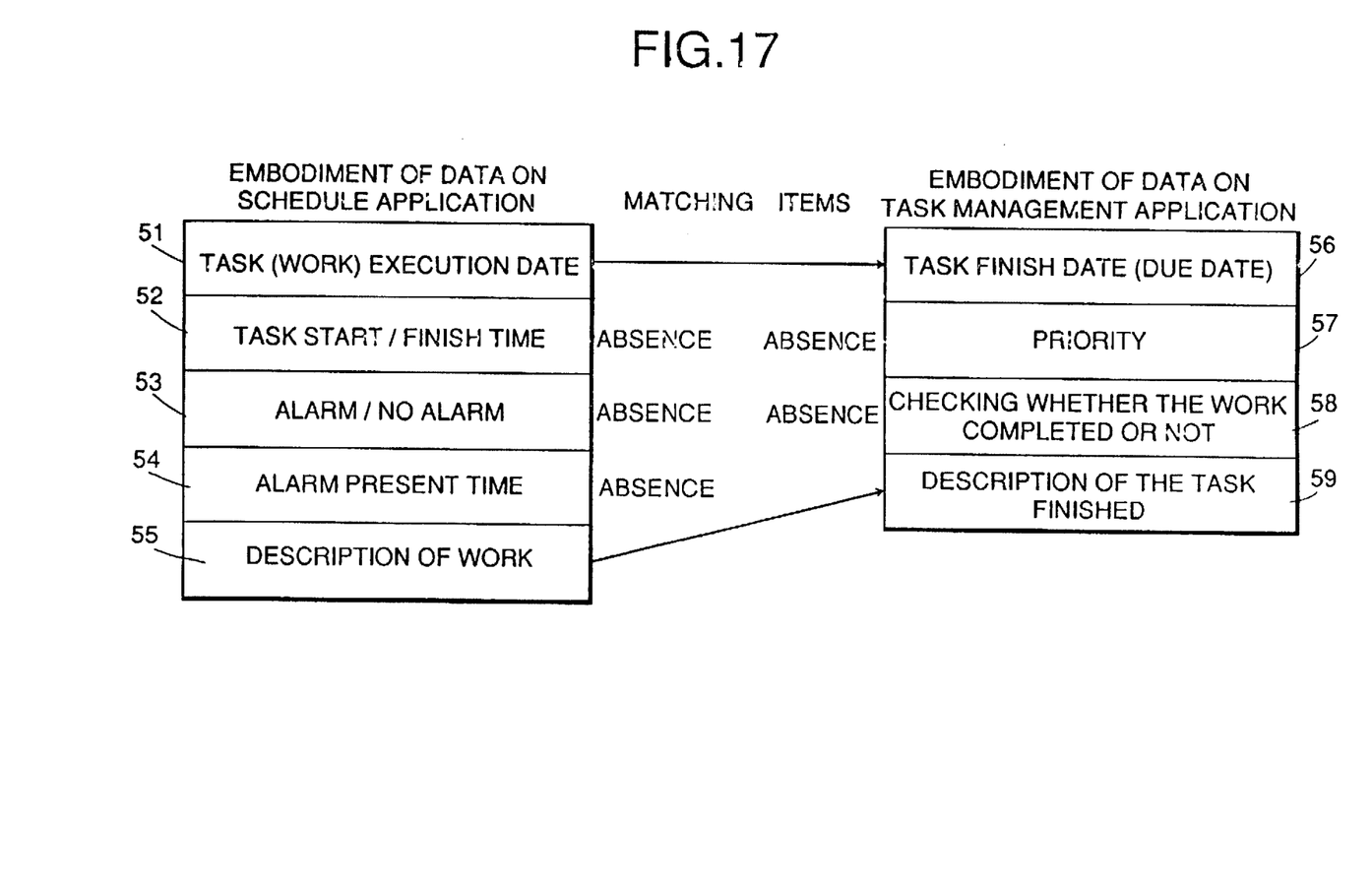
FIG. 17 shows a correlation between input items of the schedule application and input items of the task management application according to the present invention.

An input data is registered in a file provided for corresponding application in the RAM. As shown in FIG. 17, comparison of the above-mentioned items of two applications shows that the task execution date (Date) 51 and the task completion date (Due Date) 56 are date-relating items and match with each other and similar correlation exists between the task description 55 and the completed task description 59. The other items of both applications can not be correlated with each other. In this example, the task execution date 51 and the task completion date 56 as well as the task description 55 and the completed task content 59 are considered to be similar to each other in their data structure. However, the compared items may be semantically equal to each other and shall not necessarily have the same data structure.

FIG. 11 is a flow chart for explaining the operation of each application in the state of power supply ON. The operation of the information processing device is as follows:

(A) A user presses (Step S11-1) the SCHEDULE key among the application switching keys on the main body of the device shown in FIG. 3 to actuate the schedule application (Step S11-2). The schedule application immediately reads data on date (normally the current date) stored in the RTC 17 (FIG. 2), compares the data with data registered in the RAM and reads-out the matched data therefrom to the LCD display screen.

If no match is found, schedule data, which date is nearest in future to the date registered RCT 17, is read out to the LCD display screen (Step S11-3). This is hereinafter referred to as display mode for convenience sake. In this display mode, it is possible to read data before and after currently displayed data and display these data on the LCD display screen by using the PREV and NEXT keys respectively.

(B) The NEW key is pressed to proceed to a new-data input screen image for the schedule application. At Step S11-4, the edit buffer reserved for inputting and correcting data in the RAM is allocated to input items of the schedule application but each item content is cleared, thereby generating a screen image shown in FIG. 5.

In case if the current displayed data is needed to be corrected before inputting new data, the EDIT key is pressed while the data to be corrected is indicated in the display mode. At Step S11-5, the edit buffer provided for inputting and correcting data in the RAM is allocated to input items for the schedule application and their contents registered in the RAM are read out to the LCD screen, thereby generating a screen image as shown for example in FIG. 6.

The following procedure is common to both the new data inputting and the data correcting unless otherwise specified.

FIG. 12 is a flow chart describing the data inputting procedure following to Step S11-4 or S11-5.

(C) Step S12-1 indicates a screen image for editing data which is inputted as input items for the schedule application. A content of the above-mentioned editing buffer is indicated as an initial value in corresponding columns of the input items. The input item 60 (Type) is set to the name of the currently operating application, i.e., "Schedule".

(D) Step S12-2 enters input data for input items starting with the task execution date, moves a cursor to an input column for selecting an input item and enters data by using the alphanumeric keyboard or the touch panel. The input data is supposed to be as shown in FIG. 6.

(E) The user now desires to register the data being inputted in the schedule application mode as the data for the task management application. In this case, the input item of application type is selected and the item setting is changed from "Schedule" to "ToDo" to select the task management application. In this embodiment, this change is realized by touching the input item "application type" in the pull-down menu on the display screen. An exemplified screen image shown in FIG. 7 can be thus obtained.

(F) Step S12-4 conducts conversion of each item. Two input items, "task execution date (Date)" and "Task content", of the schedule function are equivalent to two respective input items, "task completion date (Due Date)" and "completed task content", of the task management application. Therefore, these two items can remain (without erasing their contents) as data for the task management application when the application name was changed from the schedule to the task management. The other input items of the task management application have no corresponding items in the schedule application and, therefore, are in blank with initial values.

Figure 9:
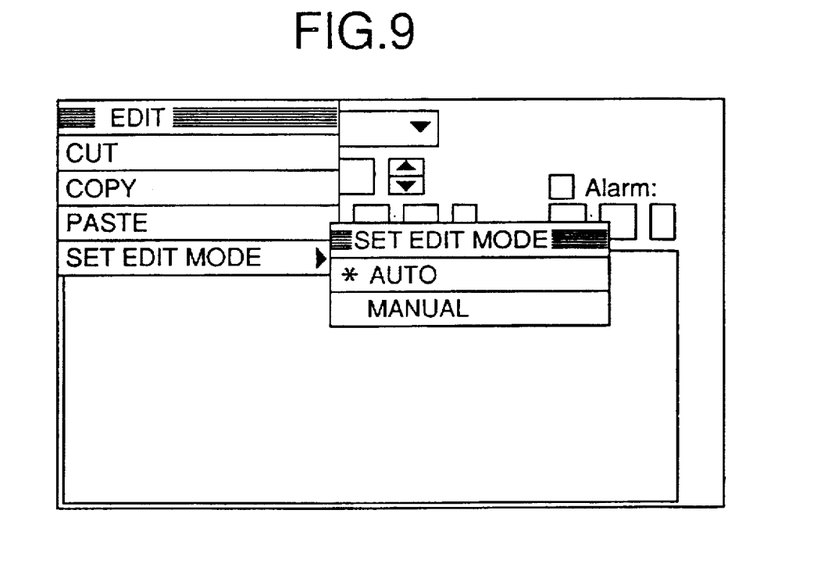
FIG. 9 shows a screen image for selecting auto mode or user mode for converting data when changing application mode according to another embodiment of the present invention.
Figure 10:
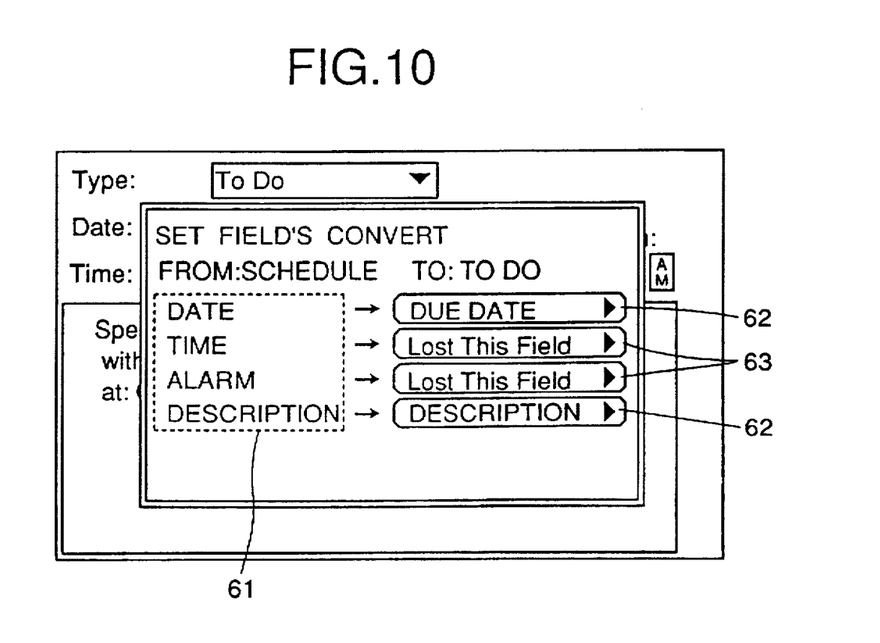
FIG. 10 shows a screen image for designating data items when user mode is selected according to the present invention.
Figure 13:
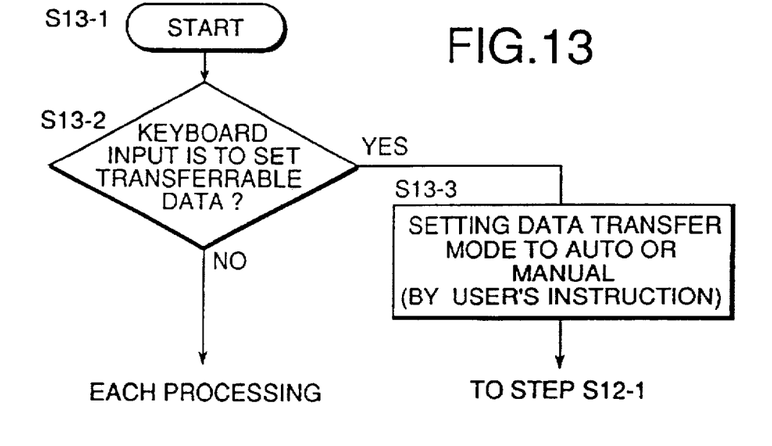
FIG. 13 is a flow chart for explaining the operation of the device when indicating menu image of FIG. 9 on a display screen.

The input screen image is then changed to indicate input items to be used for task management application (at Step S12-1). At Step S12-2, the user performs checking data for input items "priority", "task completion or incompletion" and, if necessary, corrects "task completion data" and "completed task content". Then, the uper presses the ENTER key (at Step S12-3) to enter the input data into the file for "task management application" reserved in the RAM (at Step S12-3). Referring to FIGS. 9 and 10 illustrating display screen images and FIGS. 12-14 of flow charts, the operation of a second embodiment, based on the first embodiment device, of the present invention in two modes, for example, "Schedule Application" and "Task Management Application", will be described in detail as follows:

In FIG. 10, numeral 61 indicates data items of a precedent application, numeral 62 indicates data items of a new application, whereto the transferrable data is transferred, and numeral 63 indicates data items of the precedent application, which can not be transferred into the new application mode.

In case of changing application mode from one application to the other, data obtained in the precedent application mode can be also used in the new application mode by automatically or manually transferring the data to respective positions. The selection of these data transferring modes—auto or manual (user's instruction)—is first described as follows:

After conducting Steps (A)–(C) described for the first embodiment, (G) the user, at Step S12-2 (Fig.12), presses the MENU key of the application selector potion shown in FIG. 3 to open the EDIT menu as shown in FIG. 9. This menu contains functions for editing data on a screen for inputting or correcting operation, which can be selected by touching the indicated item with a touch pen. An item "SET EDIT MODE" indicated in the lowest column in the menu is used for select how to transfer the data items—auto or manual. When the SET EDIT MODE is selected, a sub-menu will appear on the display screen, indicating two modes "AUTO" and "MANUAL". The input items will be moved automatically when the AUTO mode is selected while they will be moved manually (by the user's designation) when the MANUAL mode is selected. This processing is done at Step S13-3 after Step S12-5 of FIG. 12 has proceeded to Step S13-1 of FIG. 13.

(H) The sequences (D) and (E) described for the first embodiment are then performed. Namely, steps of the sequence are the same (D) and (E) as those of the first embodiment.

Figure 14:
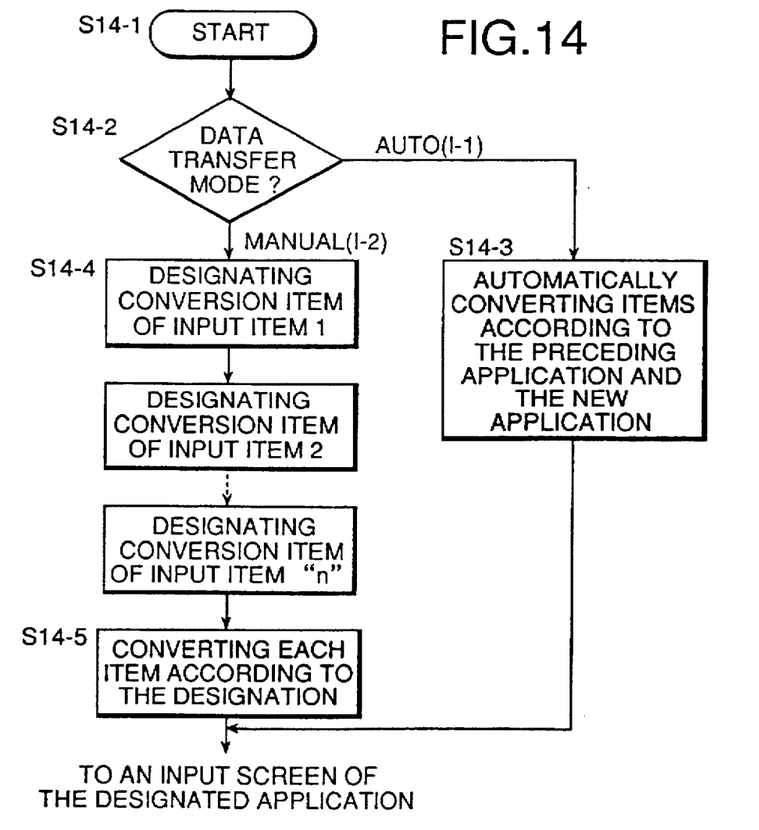
FIG. 14 is a flow chart for explaining the operation of the device with a screen image for user's designation.

In the second embodiment, Step S12-4 (FIG. 12) for converting the items in compliance with the preceding and new applications proceeds to the flow chart of FIG. 14 (beginning at Step 14-1) which has following branches I-1 and I-2 (at Step S14-2 ) depending upon the preset mode of transferring the input items:

(I-1) In case when the SET EDIT MODE for selecting the method of transferring input items is preset to AUTO by the operation (G), the processing (F) shown in the first embodiment is performed (at Step 14-3).

(I-2) The SET EDIT MODE is preset to MANUAL by the operation (G). The processing proceeds to the sequence beginning with Step S14-4 for specifying conversion data of each input item. Referring to FIG. 10, the display indicates a screen image that includes an input item 61 for setting therein data of the preceding application mode, an input item 62 transferrable into the new application mode together with a check box and an input item not to be transferred. The user determines whether each data of the preceding application mode to be transferred or not to be transferred into the corresponding input item of the new application mode by specifying with a touch pen. On completion of the above-mentioned determination of all input items of the preceding application, the procedure advances to Step S14-5 to convert data according to the above-mentioned designation made by the user.

The procedure then proceeds to Step S12-1 whereby the display is turned to indicate a screen image for inputting data of input items used for the task management application.

Referring to FIG. 8 depicting a display screen image and FIGS. 12, 15 and 16 A, 16 B showing flow charts, the operation of a third embodiment, based on the first embodiment device, of the present invention in two modes, for example, "Schedule Application" and "Task Management Application" will be described below, beginning at the stage after the processes (A) to (E) described in the first embodiment have been finished. These processes (A) to (E) are common for the third embodiment.

Figure 18:
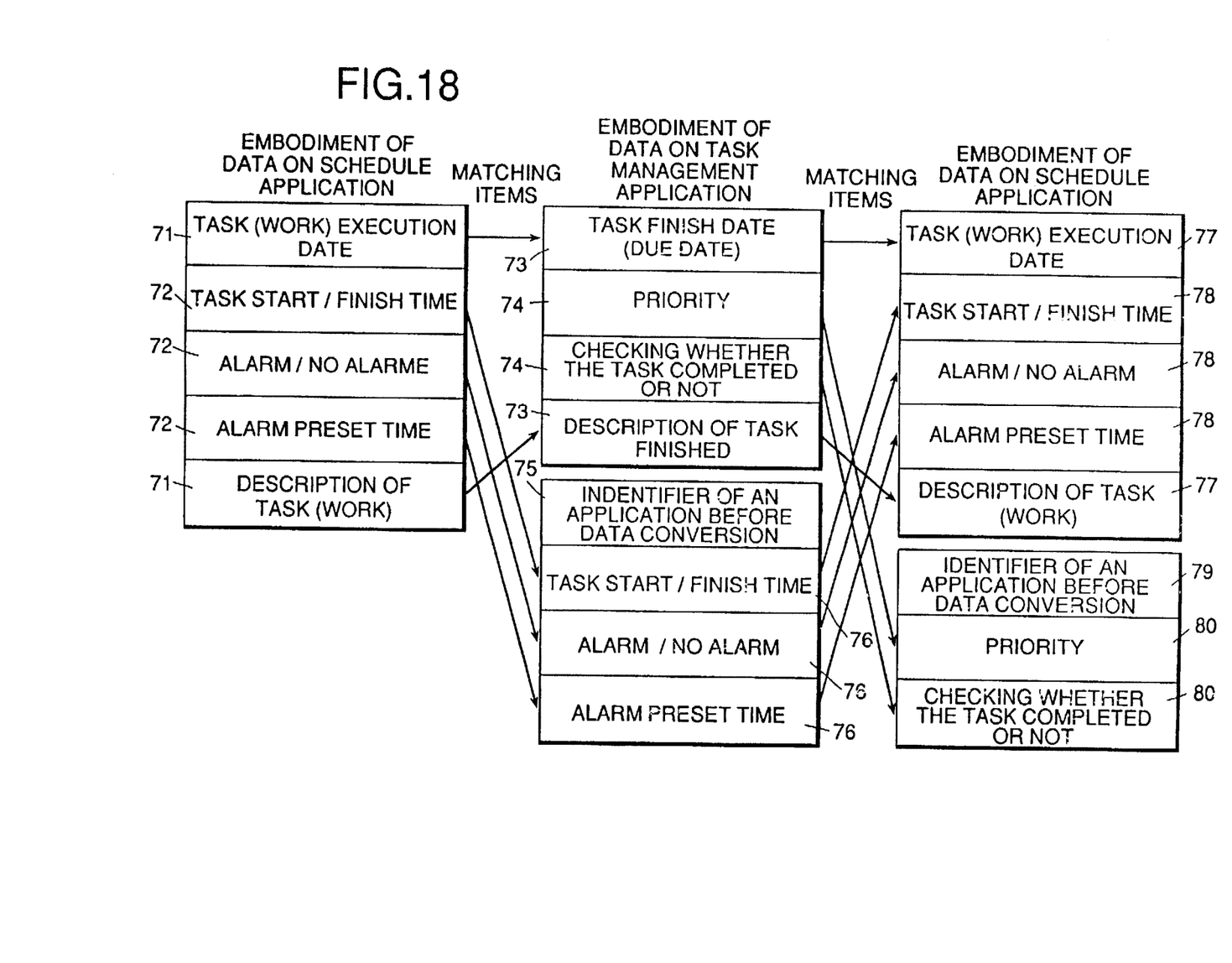
FIG. 18 shows how to move and store data items at the time of changing application mode according to the another embodiment of the present invention.

(J) Step S12-4 of FIG. 12 is intended to convert each input item. FIG. 18 depicts an example of records in a buffer provided in the RAM. In this embodiment, data 71 and 72 inputted in the schedule application mode shall be converted into data for the task management application and be stored in such a way that input items 73 and 74 of the task application are recorded together with an item 75 for identifying the preceding application to which the converted data relates. A recording area 76 is also reserved for items of the schedule application, which were not converted into data items for the task management application.

Similarly with the case of the first embodiment, two input items "Task execution date (Date)" and "Task description" of the schedule application are converted into input items "Task completion date (Due Date)" and "Completed task description" of the task management application in a buffer area for input items of the task management application. The other input items of the task management application have no input data as an initial state since the preceding schedule application has no corresponding items.

The area for identifying the preceding application, which is provided in the buffer (as an area for identifier of an application before conversion 75 of an example of data for task management application shown in FIG. 18), stores therein a value for identifying the schedule application. Descriptions of the corresponding items 72 are stored in the area 76 for recording items of the schedule application, which were not converted into the item of the task management application.

Figure 15:
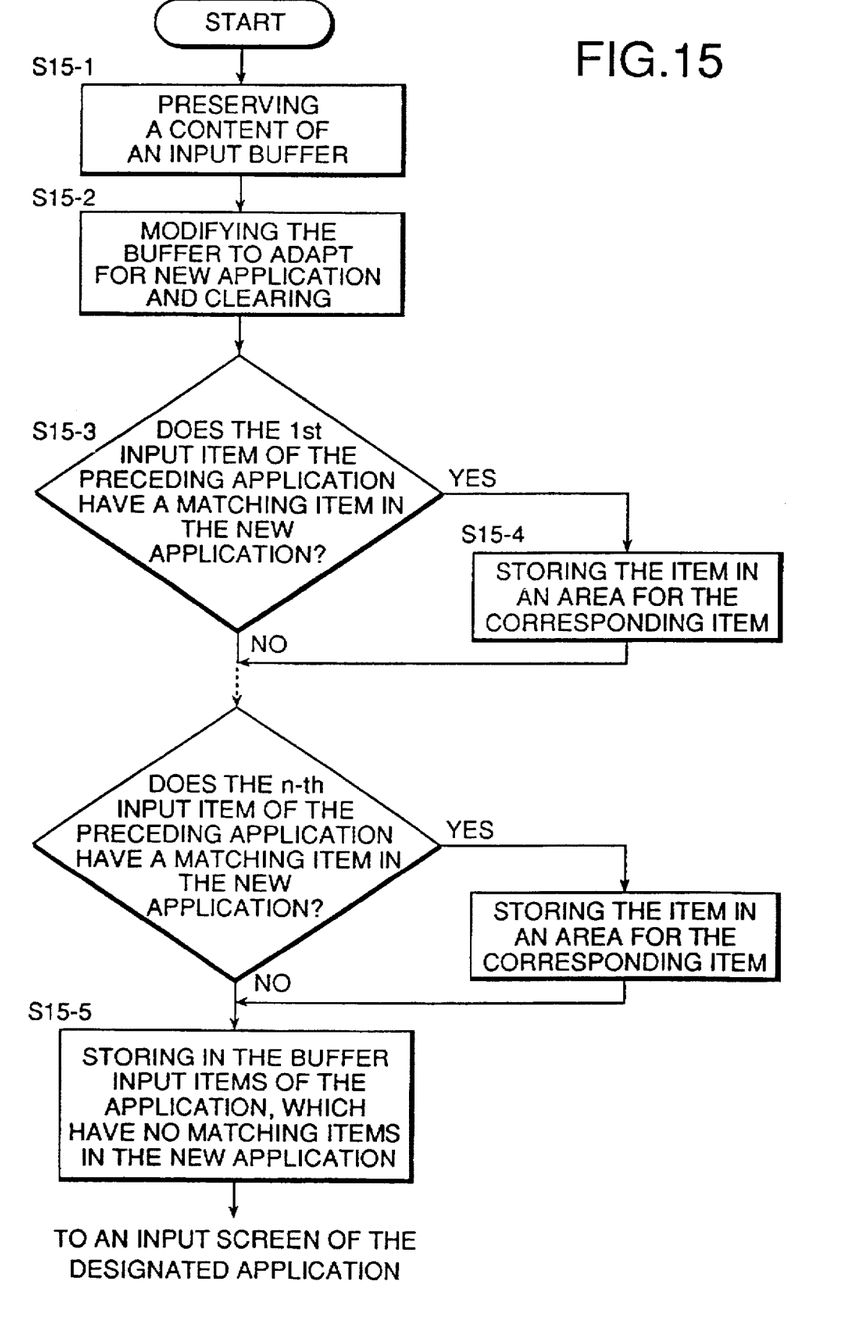
FIG. 15 is a flow chart for explaining the operation of the device when switching a schedule function to a task management function in case of FIG. 18.

The above-mentioned operation is realized according to a flow chart shown in FIG. 15. At Step S15-1 of FIG. 15, a content of the input buffer is temporary preserved in an other area of the RAM (45 of FIG. 4). At Step S15-2, the buffer is so converted that its structure is adapted for the new application and then it is cleared. At this time, the data items of the new application and data items of the preceding application, which have no matching items in the new application, are both provided in the new buffer.

The data item for identifier of the preceding application is given a code indicating the schedule application. The data items of the preserved buffer are compared with the data items of the new application and the matched items are stored at corresponding item positions in the buffer (at Steps S15-3 and S15-4). The unmatched items are stored in a buffer for unconverted items (at Step S15-5).

(K) After all items have been compared and stored in the respective buffers, an input screen image of the designated application is selected and, then, Step S12-1 for the task management application is performed. The input screen image is turned to a screen image for entering input items used for the task management application wherein the user enters each item data.

(L) Now, it is supposed that the user changes again the input data for the task management application to the data for the schedule application. FIG. 18 depicts an example of the records in the buffer provided for this use in a store such a RAM. In case of converting the data being inputted in the task management application mode into the data for use in the schedule application mode as will be described in this embodiment, the store mean after application change must have areas for input data items 77 and 78 for the schedule application, an area for an item 79 for identifying the preceding application and an area 80 for items of the task management application, which have not been converted to those of the schedule application.

As the case of the first embodiment, according to the inverted procedure (J), two input items 73 "Task completion date (Due Date)" and "Completed task description" of the task management application are converted into two input items 77 "Task execution date (Date)" and "Task description" of the schedule application.

The area 79 for identifying the preceding application, which is provided in the buffer, stores therein a value for identifying the task management application. The descriptions of the corresponding items 74 "Priority" and "Check for completion of the task" are stored in the area 80 for recording items of the task management application, which were not converted into the item of the schedule application. The items 76 "Task start/end time (Time)", "Alarm/No Alarm" and "Alarming time" of the schedule application, which have no equivalent thereof in the task management application, have been stored in the buffer in the stage (J). These stored items are returned therefrom into the items 78 of the schedule application and reused.

Figure 16:
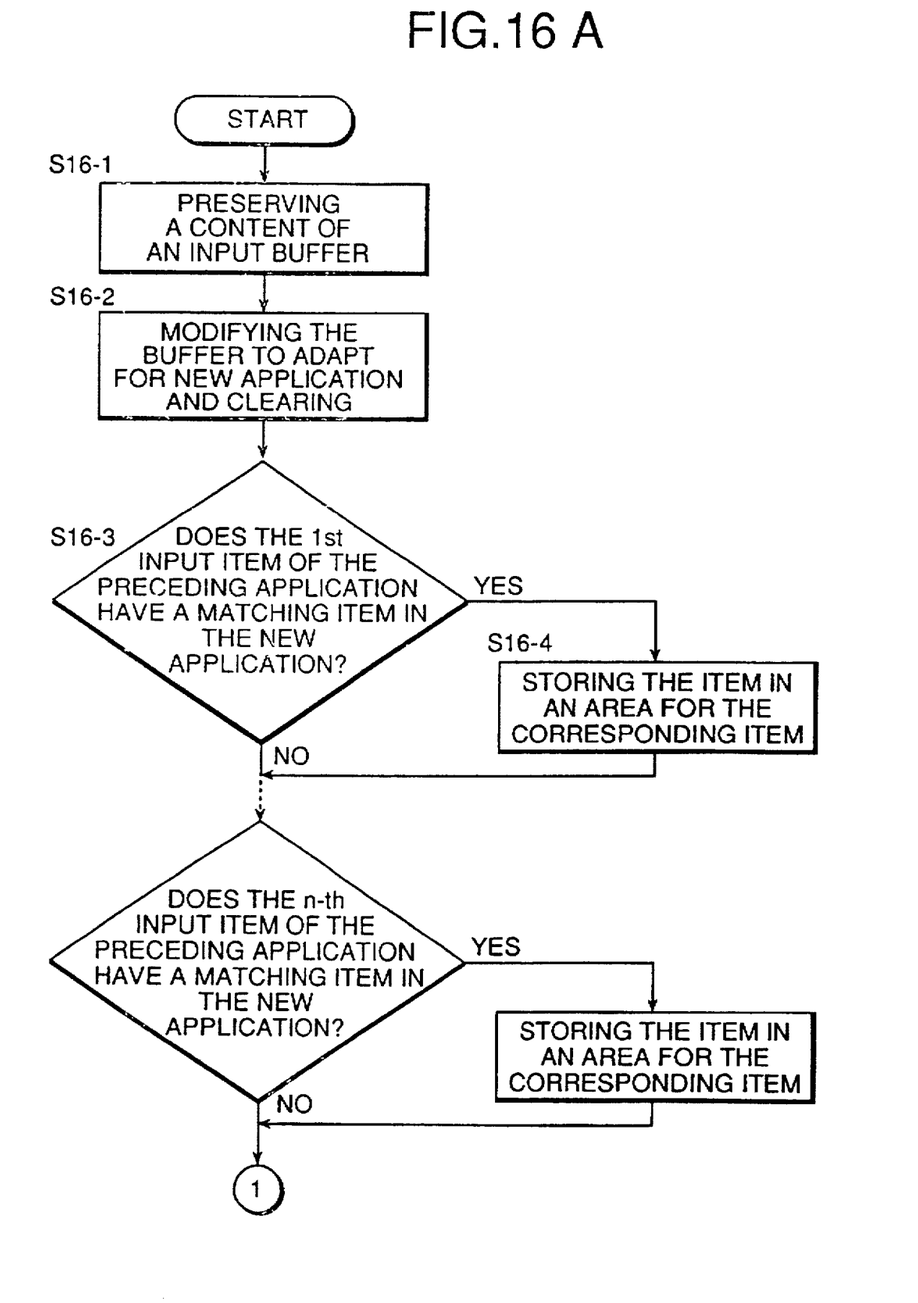

The above-mentioned operation is realized according to the flow charts shown in FIGS. 16 A and 16 B. At Step S16-1 of FIG. 16 A, a content of the input buffer is temporary preserved in another area of the memory. At the next Step S16-2, the buffer is cleared and so modified that its content has the same structure that the new application has, and then is cleared. At this time, the data items of the new application and data items of the preceding application, which have no equivalents in the new application, are both stored in the new buffer. The data item for identifying the preceding application is given a code denoting the task management application.

The data items (73, 74 of FIG. 18) which were used in the preceding application and have been moved from the buffer and preserved in the another area of the memory are compared with the data items (77, 78 of FIG. 18) for the new application and the matched data items are stored within the buffer (at Steps S16-3 and S16-4). When all items have been checked the identifier (75 of FIG. 18) of the preceding application is checked for coincidence with the identifier of the new application. When the identifiers match with each other the data (76 of FIG. 18) which have been stored in the buffer at the time of preceding data conversion will be stored in the newly prepared current buffer (at Steps S16-5 and S16-6). Last of all, those of the items (73, 74 of FIG. 18) preserved and used for the preceding application, which have no matched items, are stored in a buffer (80 of FIG. 18) prepared for them (at Step S16-7).

(M) On completion of the data conversion, the processing proceeds to Step S12-1. The screen image is changed to an input mode screen for entering input items to be used for the schedule application as shown in FIG. 8. The user enters each of input data items again. The procedure of correcting and storing the input data is the same as described in the first embodiment.

As may be apparent from the foregoing, the present invention offers the following effects:

A conventional pocket-computer requires user to previously specify what kind of application is used and then to enter input data individually used for the specified application.

On the contrary, an information processing device defined in claim 1, being free from the above-mentioned drawback of the conventional device, allows the user to enter data therein and then to decide the application for which the input data is registered and to easily change the application during the data inputting.

In changing a operating application to another one, equivalent input items can be used as kept their content. This makes it possible to reduce the user's labor for entering data and to effectively use input data.

According to the present invention, as described in claim 2, it is possible to transfer input data in either of two modes—automatically according to a preset transferring pattern or manually according to the user's instruction. The latter case assures more finely transferring of data prepared by the user.

According to the present invention, as defined in claim 3, input data items used for the application to be changed with another one are stored in a buffer during the edition of input data, thereby those of input items for the preceding application, which have no matching items in the new application, can be re-used if the replaced application is selected again later. This may widen the field of effective use of data.

I claim:

1. A information processing device comprising a data inputting means, a first store means for storing data inputted from the data inputting means, a second store means for storing a plurality of programs, a reading means for reading the data stored in the first store means, a correcting means for correcting the data read by the reading means, a display means for indicating on its screen the read data being corrected or inputted and a control means for controlling the above-mentioned means, characterized in that the data inputting means is capable of inputting data in any of at least two application modes according to the programs stored in the second store means, each application mode has a plurality of input items, said input items are stored in the first store means in a record structure adapted to said application mode, a mode switch means is provided for changing an initial application mode to another during inputting or correcting data in the initial application mode and the data inputted and corrected in the initial application mode can be used in a new application mode immediately after changing the initial application mode to the new application mode.

2. An information processing device as defined in claim 1, characterized in that a sequence of operations for transferring the initial data after changing the initial application mode into a new application mode can be carried-out automatically or according to user's commands in such a way that input items of the initial application mode are compared with input items of the new application mode, thereby input items of the former, which contents are common with those of the input items of the latter, are transferred into the new application mode and input items being different in content from those of the latter are not transferred into the new application mode.

3. An information processing device as defined in claim 1, characterized in that when the application mode is changed and the initial data includes data that can not be used for a new application mode, said data are stored together with data for new application mode in an area or stored separately in a different area of the second store means.

* * * * *